United States Patent [19]

Bay et al.

[11] Patent Number: 5,765,772

[45] Date of Patent: Jun. 16, 1998

[54] DATA CARTRIDGE CORNER ROLLER WITH STEPPED BORE

[75] Inventors: Randy S. Bay; James L. Albrecht; Matthew J. Schaenzer, all of Wahpeton, N. Dak.; Mary R. Hable, Stillwater, Minn.; David L. Tussey, New Richmond, Wis.

[73] Assignee: Imation Corp., Oakdale, Minn.

[21] Appl. No.: 818,263

[22] Filed: Mar. 17, 1997

Related U.S. Application Data

[63] Continuation of Ser. No. 493,888, Jun. 23, 1995, abandoned.

[51] Int. Cl.$^6$ ............... G11B 23/087; G11B 23/04
[52] U.S. Cl. ............................. 242/342; 242/340
[58] Field of Search ........................... 242/340, 342, 242/352.4; 360/132

[56] References Cited

U.S. PATENT DOCUMENTS

| | | | |
|---|---|---|---|
| 4,199,794 | 4/1980 | Pfost et al. | 242/352.4 X |
| 4,688,724 | 8/1987 | Hettich | 242/352.4 |
| 5,416,659 | 5/1995 | Saiton et al. | 360/132 |
| 5,448,440 | 9/1995 | Law et al. | 360/132 |
| 5,516,055 | 5/1996 | Gerfast et al. | 242/352.4 X |

FOREIGN PATENT DOCUMENTS

| | | |
|---|---|---|
| 29 30 646 | 3/1980 | Germany. |
| 91 01 648 | 5/1991 | Germany. |

*Primary Examiner*—John Q. Nguyen
*Attorney, Agent, or Firm*—Eric D. Levinson

[57] ABSTRACT

A corner roller for a belt-driven tape cartridge consists of an outer wall which contacts a drive belt in the cartridge and an inner wall attached to the outer wall. The inner wall includes a stepped axial bore which engages a shaft attached to a baseplate of the cartridge. A small diameter region of the axial bore forms a journal bearing surface for the shaft, and this surface preferably has a length and orientation with respect to the cartridge baseplate sufficient to symmetrically distribute on the journal bearing surface a load exerted on the corner roller by the cartridge belt.

2 Claims, 6 Drawing Sheets

DATA CARTRIDGE CORNER ROLLER WITH STEPPED BORE

This is a continuation of application No. 08/493,888 filed Jun. 23, 1995 abandoned.

BACKGROUND OF THE INVENTION

1. Field of the Invention

The present invention relates to a corner roller for a belt-driven tape cartridge. In particular, the invention relates to a corner roller for a belt drive data tape cartridge which includes a stepped axial bore having a large diameter region and a small diameter region. The small diameter region forms a journal bearing surface for the corner roller shaft. The regions in the bore are preferably dimensioned and oriented with respect to the cartridge baseplate to symmetrically distribute over the journal bearing surface a load exerted on the corner roller by a cartridge belt.

2. Description of Related Art

A highly successful elastic belt-driven data cartridge originally described in U.S. Pat. No. 3,692,255 to von Behren features tape wrapped convolutely in opposite directions around a pair of hubs to form a pair of tape packs. An elastic belt wraps part-way around the tape packs and the hubs, as well as around at least two corner rollers and a drive roller. In a tape drive configured to accept the cartridge, the belt is moved by the drive through frictional rotation of a drive puck by a motor. If adequate tension is maintained in the belt, movement of the belt will simultaneously move the tape. The tape traverses an arrangement of guide pins and moves past a read/write head in the drive. Friction at the corner rollers will differentially stretch the outer surface of the belt, which tensions the tape so that it can interface properly with the read/write head.

As shown in FIG. 1, in a data tape cartridge 10 with a baseplate 12 and a cover 14, each corner roller 16 is a generally cylindrical component which consists of an outer wall 16A and an inner wall 16B. The outer wall 16A is designed for contact with a drive belt 18 in the cartridge. The external periphery of the outer wall 16A may include a crown 24 to prevent the belt 18 from slipping away from a centered position on the wall. The inner wall 16B of the corner roller includes a longitudinal axial bore 20 with a diameter sufficient to receive a journal shaft or pin 22. The shaft 22 is rigidly mounted generally normal to the cartridge baseplate 12. The belt 18 contacts and wraps around the outer wall 16A of the corner roller, and movement of the belt rotates the corner roller 16 about the journal shaft 22. A lubricant (not shown), such as, for example, a synthetic or hydrocarbon grease, is provided on the internal surface of the bore 20 at an interface between the rotating corner roller and the shaft 22.

As the belt wraps around the corner roller, it exerts a resultant side load, F, generally at the center of the belt in a direction generally normal to the longitudinal axis of the journal shaft 22. The resultant side load is applied at a distance A from an upper surface 12A of the baseplate 12 of the cartridge and a distance B from an upper end 20A of the bore 20. In the cartridge described in the '255 patent, A=B, the resultant side load was applied at the midpoint along the length C of the axial bore 20, and the journal surface on the wall of the bore 20 was symmetrically loaded along its entire length. Symmetrical loading of the journal surface evenly distributes the load over the journal bearing area and reduces wear caused by the corner roller 16 sliding and rotating on the journal shaft 22.

Since its inception, the basic cartridge design described in the '255 patent has been modified in many ways to increase recording capacity, increase tape transport speed, more precisely control tape tension, reduce drive force, and prolong cartridge life. For example, to increase tape magnetizeable surface area and increase recording capacity, the conventional 0.250 inch (6.35 mm) wide magnetic tape described in QIC 143 was replaced with a wider 0.315 inch (8.00 mm) tape (see QIC 161 and 162).

The increased tape width described in QIC 161 and 162 necessitated changes in certain internal cartridge dimensions. For example, to center the belt on the tape packs for efficient belt-tape contact, the wider tape required increasing the running height of the belt with respect to the cartridge baseplate. As shown in FIG. 2, this running height increase in turn required raising the belt, and the resultant belt side load, F1. Therefore, A, the distance from the upper surface 212A of the baseplate 212 of the cartridge, became greater than B, the distance from the center of the belt 218 to an upper end 220A of the bore 220. To symmetrically load the journal surface in the bore 220 along its entire length C required that the length of the bore be increased until A=B. This increase in bore length in turn required that the total height of the corner roller be increased.

However, to retain backward compatibility with existing drives, the outer dimensions of the cartridge could not be altered, and the distance between the upper surface 212A of the baseplate and the upper surface 214A of the cover, designated D in FIGS. 1–2, could not be increased to accommodate a "taller" corner roller. Apart from molding a thinner cover, which would adversely affect cartridge durability, the limitation on the height of the cartridge limited potential modifications to the dimensions of the corner roller.

As illustrated in FIG. 2, if the resultant side load applied by the belt, F1, is not centered on the journal shaft 222, the journal surface on the wall of the corner roller bore 220 is not symmetrically loaded. The points 230,231 near the top and bottom, respectively, of the corner roller bore 220 are unequally loaded, and the increased loading near the top point 230 causes accelerated wear in the top of the bore. This accelerated wear on corner roller components adversely affects cartridge drive force and tape tension, which do not remain within acceptable limits over the life of the cartridge. The increased wear limits the useful life of the cartridge, and the conventional corner roller design was determined inadequate to meet projected future recording needs.

SUMMARY OF THE INVENTION

The corner roller of the invention has an axial bore with a non-constant diameter. The variation in diameter forms a large diameter region and a small diameter region of the bore. The small diameter region of the bore has a diameter such that an internal wall of the small diameter region forms a journal surface for the corner roller shaft. The length of the small diameter region, as well as its position with respect to the cartridge baseplate, may vary widely depending on the configuration of the corner roller, but the dimensions and placement are preferably selected such that the journal surface is symmetrically loaded by the resultant side load exerted on the corner roller by the cartridge belt. The large diameter region of the bore has a diameter sufficient such that the internal wall of the large diameter region does not contact the corner roller shaft. A step may be formed in the bore between the large diameter region and the small diameter region of the bore, or the large and small diameter regions may taper into one another.

The journal surface created by the small diameter region of the non-constant diameter bore in the corner roller of the invention may be positioned to symmetrically load the corner roller, which reduces corner roller wear. The benefits of this enhanced corner roller durability are then realized in an existing cartridge design having external dimensions compatible with standard drives.

In addition to the reduced wear rate over the life of the component, extended durability testing of data cartridges which use the corner roller of the invention revealed some unexpected improvements in cartridge drive force and tape tension properties.

It is well known in the art that the minimum tape tension in a belt driven data cartridge increases with increasing tape speed. Data cartridges which use two corner rollers of the invention show less speed dependency of minimum tape tension than controls using corner rollers with conventional constant diameter bores. This reduced variation in minimum tape tension permits more precise contact between the tape and a read/write head as tape speeds vary widely during recording or playback. Enhanced contact with the head reduces lost data.

It is also well known that maximum tape tension in a belt driven data cartridge increases as tape speed increases. Data cartridges which use two corner rollers of the invention show less speed dependency of maximum tape tension than controls using corner rollers with conventional constant diameter bores. This reduced variation in maximum tape tension reduces wear on the read/write head and prevents tape distortion over a wide range of tape speeds.

Further, it is well known that drive force in a belt driven data cartridge increases as tape speed increases. Data cartridges which use two corner rollers of the invention show less speed dependency of drive force than controls using corner rollers with conventional constant diameter bores. This reduced variation in drive force means that data cartridges using the corner rollers of the invention will consume less power, particularly at higher speeds, than conventional cartridges.

Finally, it is well known that drive force in a belt driven data cartridge increases over the life of the cartridge. Data cartridges which use two corner rollers of the invention show less drive force increase in extended durability testing than controls using corner rollers with conventional constant diameter bores. Cartridges using the corner rollers of the invention will therefore consume less power over their lifetimes than conventional cartridges.

In belt driven data cartridge design, a component modification which reduces maximum drive force generally causes an undesirable decrease in tape tension. However, the drive force reduction produced by the corner rollers of the invention does not decrease tape tension, and, for this reason, the drive force reductions are quite significant.

While not wishing to be bound by any theory, the above-described drive force reduction and lessened dependence of tape tension on speed may occur because the larger diameter region of the bore acts as a reservoir for lubricant, continuously supplying the smaller diameter journal-bearing region of the bore with lubricant over the life of the component.

DETAILED DESCRIPTION OF THE PREFERRED EMBODIMENTS

Figure 1:
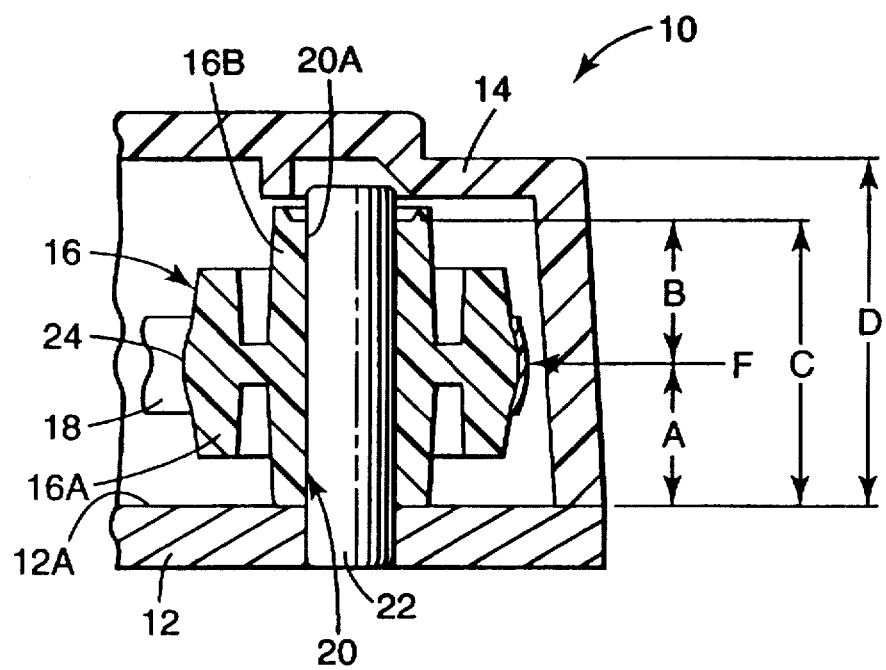
FIG. 1 is a cross-sectional view of a conventional corner roller in a belt driven data tape cartridge with 0.250 inch (6.35 mm) wide tape.
Figure 2:
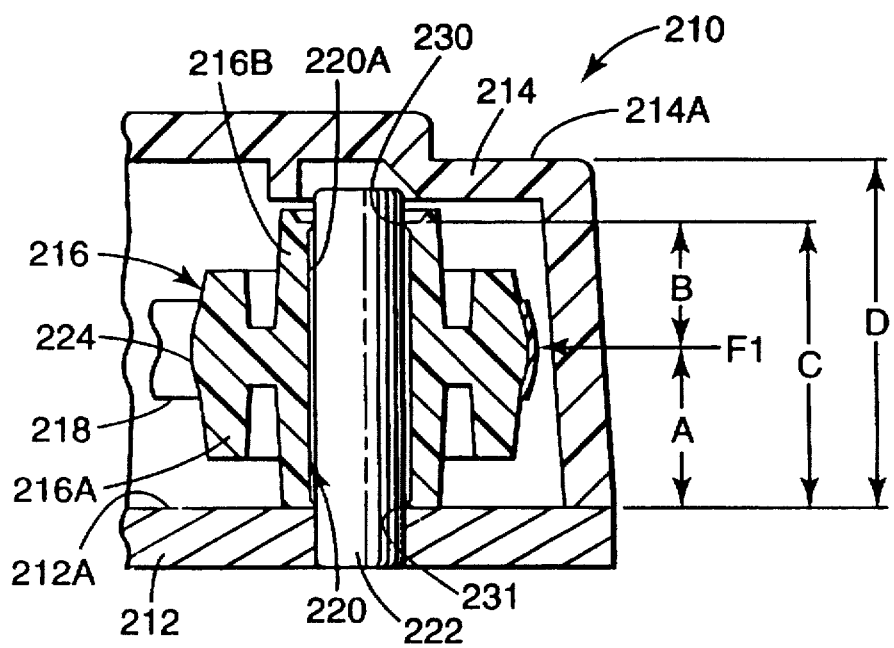
FIG. 2 is a cross-sectional view of a conventional corner roller in a belt driven data tape cartridge with 0.315 inch (8.00 mm) wide tape.
Figure 3:
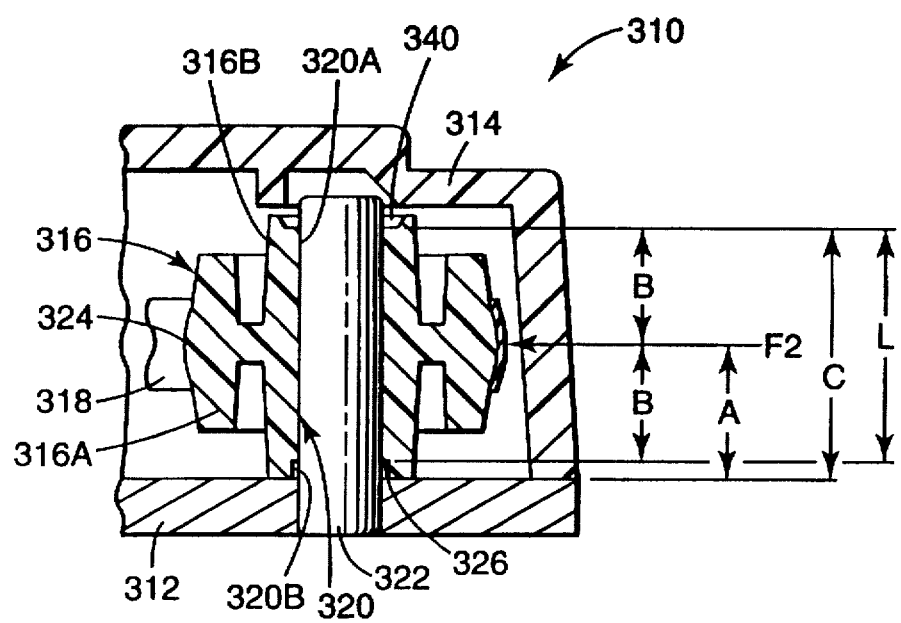
FIG. 3 is a cross-sectional view of an embodiment of the corner roller of the invention.

Referring to FIG. 3, in a data tape cartridge 310 with a baseplate 312 and a cover 314, each corner roller 316 is a generally cylindrical component that rotates about a shaft 322 rigidly mounted generally normal to the cartridge baseplate 312. A belt 318 contacts and wraps around the corner roller, and movement of the belt rotates the corner roller 316 about the shaft 322.

The corner roller 316 consists of an outer wall 316A and an inner wall 316B. The outer wall 316A is designed for contact with the belt 318, and may include a crown 324 to maintain the centered position of the belt on its outer surface. The inner wall 316B includes a longitudinal axial bore 320 having a small diameter region 320A and a large diameter region 320B.

The diameter of the small region 320A of the bore is sufficient to precisely engage the shaft 322. Generally, the diameter of the small region 320A of the bore should be about 1.1 mils (0.028 mm) greater than the diameter of the shaft 322, i.e., the radial clearance between the internal wall of the small diameter region 320A and the shaft should preferably be about 0.5 mils (0.014 mm). The internal wall of the small diameter region 320A of the bore also has a surface roughness of about 22 microinches (0.56 μm) to about 38 microinches (0.96 pm), preferably about 28 microinches (0.71 μm), as measured by a Taylor-Hobson Talysurf 10 apparatus.

As noted above, a lubricant (not shown) is provided on the internal surface of the small diameter region of the bore 320 between the corner roller inner wall 316B and the shaft 322.

FIG. 3 also shows a slight sink or concavity 340 adjacent the top of the inner wall 316B of the corner roller. When the corner roller is formed from a polymeric material, the sink 340 forms naturally as the corner roller cools after release from its mold.

The internal surface of the small region of the bore forms a journal surface for the shaft 322. The length L of the small region of the bore, as well as its position with respect to the cartridge baseplate, may vary widely depending on the configuration of the corner roller, but the dimensions and placement are preferably selected such that the journal surface 320A is generally symmetrically loaded by the resultant side load exerted by the cartridge belt.

For example, if the resultant side load, F2, is applied a distance A from an upper surface 312A of the baseplate 312 of the cartridge and a distance B from an upper end 322A of the journal shaft 322, the length L of the small diameter region 320A is preferably selected such that the resultant side load is symmetrically applied along the length of the journal surface L. If the resultant side load is applied at the midpoint along the length L of the small region 320A of the axial bore, the journal surface on the exposed wall of the small region 320A of the bore is symmetrically loaded along its entire length. Symmetrical loading of the journal surface evenly distributes the load over the journal bearing area and reduces wear caused by the corner roller 316 sliding and rotating on the journal shaft 322.

The large diameter region 320B of the bore 320 has a diameter larger than the shaft 322 so there is no contact between the exposed surface of the large region of the bore and the shaft 322. The diameter of the large region 320B should be selected so the area between the shaft 322 and the exposed surface of the large diameter region 320B is sufficiently large to serve as a storage area for a lubricant. The diameter of the large diameter region 320B is preferably about 0.004 inches (0.102 mm) larger than the diameter of the small diameter region 320A.

In the embodiment shown in FIG. 3, a step or shoulder 326 is formed between the small region 320A of the bore and the large region 320B. In the alternative, a tapered region may reside between the small region and the large region.

While the length L of the small diameter region 320A is preferably selected such that the journal area is symmetrically loaded, if maximum corner roller wear resistance is not a primary concern, such an arrangement is not required. Even if the journal area is not symmetrically loaded, performance of the cartridge may be improved as a result of the enhanced lubrication effects provided by the large diameter region 320B of the bore 320.

Figure 4:
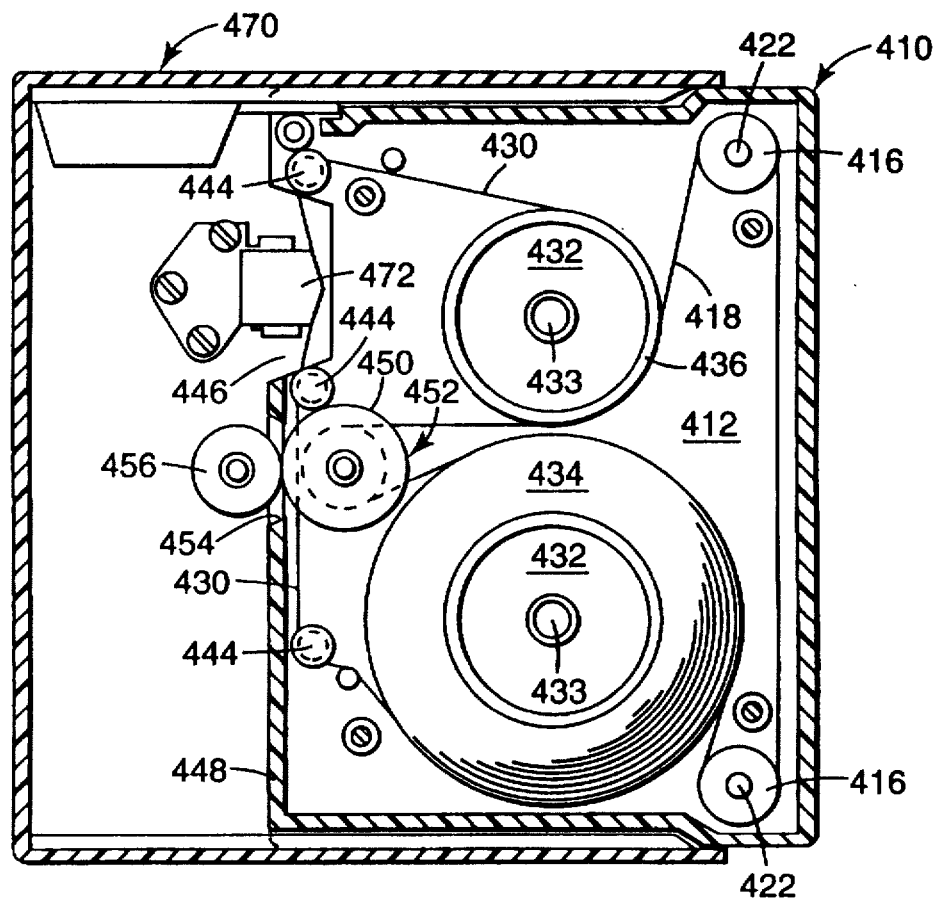
FIG. 4 is a plan view of a drive and a data tape cartridge which incorporates the corner rollers of the invention.
Figure 5:
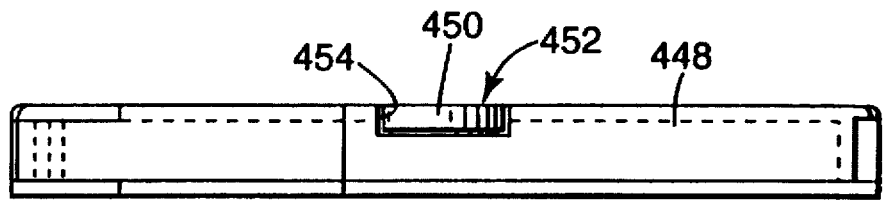
FIG. 5 is a front view of the cartridge of FIG. 4.

FIGS. 4 and 5 illustrate an embodiment of a drive 470 and belt driven cartridge 410 in which the corner roller of the invention might be used. The recording tape 430 is wrapped in opposite directions around hubs 432 which are rotatably mounted on the cartridge baseplate 412. Each hub 432 rotates on a bearing mounted shaft 433 which is generally normal to the baseplate 412. The wrapped tape forms a pair of tape packs 434 and 436 which, depending on the direction of tape motion, will function as a supply pack and a take-up pack, respectively. The tape 430 is guided by an arrangement of guide pins 444 past a read/write opening 446 in a front wall 448 of the cartridge. The front wall 448 is substantially perpendicular to the cartridge baseplate 412.

Drive surfaces 450 are part of or are mounted to a drive roller 452. As shown in FIGS. 4–5, access opening 454 is formed in the front wall 448 of the cartridge shell adjacent the drive surface 450 of the drive roller 452 to allow access to the drive roller from the outside of the cartridge by a drive puck 456. An elastic belt 418 wraps around the drive surface 450 of drive roller 452, contacts the supply pack 434, wraps around at least two corner rollers 416, contacts the take-up pack 436, and returns to the drive roller.

The cartridge of the invention may be placed in any conventional tape drive so information may be read or written to the tape in the manner well known in the art. As shown in FIG. 4, a typical drive 470 according to the invention includes a read/write head 472, and a drive motor (not shown) with a suitable drive gear or puck 456. The drive 470 includes all of the many other items necessary for its function, for example, a loading mechanism, circuitry to interpret magnetic signals detected by the head from the tape and to write to the tape, circuitry to position the head relative to the tape, and the like. Such drive elements are well known to one of ordinary skill in the art and therefore will not be further described here.

If a tape cartridge according to the present invention is placed in drive 470 as shown in FIG. 4, the read/write head 472 is positioned adjacent the read/write opening 446, where it has access to the tape 430. Drive puck 456 is positioned against the drive roller 452. To advance the tape in either direction, the drive motor drives the drive puck 456, which in turn drives the drive roller 452. Frictional engagement between the drive roller 452 and the continuous belt 418 causes the belt to move in the driven direction. As the belt 418 moves, it contacts a first tape pack over a given arcuate segment, wraps around the first corner roller and the second corner roller, contacts the second tape pack over a given arcuate segment, and returns to the drive roller. The contact between the belt and the tape packs moves the tape.

The drive belt of the invention may be made of any suitable elastomeric material, and is preferably an endless belt. The belt tension may vary widely, but should be sufficient to maintain firm contact between the belt and the respective tape packs.

In the preferred embodiments, the tape is a magnetic recording tape. However, within the scope of the present invention, the term "tape" includes microfilm, paper webs or any other elongated flexible web material which may be transported between a pair of reels.

The present invention will be further described with reference to the following examples.

EXAMPLES

Example 1

A set of stepped bore corner rollers was molded in which the nominal diametrical difference between the corner roller shaft and the small diameter region of the bore was about 0.0013 inches (0.033 mm). The nominal diametrical difference between the diameter of the large diameter region of the bore and the diameter of the small diameter region of the bore was about 0.004 inches (0.102 mm). The large diameter region and the small diameter region were joined by a 45 degree taper nominally about 0.002 inches (0.051 mm) long. A flash well was also included on one end of the corner roller and an assembly lead-in was included on the opposite end.

The length L (see FIG. 3) of the small diameter region of the bore, about 0.322 inches (8.18 mm), was selected such that the load created by the belt on the outer diameter of the corner roller was evenly distributed. The length of the large diameter region of the bore was about 0.040 inch (1.02 mm).

Ten data tape cartridges were assembled, each with two stepped bore corner rollers, and in each corner roller the large diameter portion of the bore was positioned adjacent the cartridge baseplate. The journal surface on the small diameter of the bore was lubricated with about 9 mg of a synthetic lubricant.

Ten otherwise identical control cartridges were also assembled with conventional (constant diameter bore) corner rollers.

A. Tape Tension

First, the tape tension performance of the cartridges with stepped bore corner rollers was compared to that of the control cartridges.

Initial minimum tape tension, maximum drive force, and maximum tape tension were measured using a tape tension and drive force tester. The tape tension and drive force tester used a sensor on a post to measure tape tension at the drive head. The post also includes a light roller which simulates a drive head.

A cartridge was inserted into the tape tension and drive force tester, and a conditioning pass at 90 inches per second (ips) (2.29 m per second) was performed. Then the cartridge was run at 25 ips (0.635 m/sec) over 40% of the tape length. The tape speed then automatically changed to 90 ips for operation over the remaining 60% of the tape length. Minimum values were then determined from data taken over the first 90% of the 25 ips operation. Maximum values were determined from data taken over the last 70% of the 90 ips operation.

Figure 6:
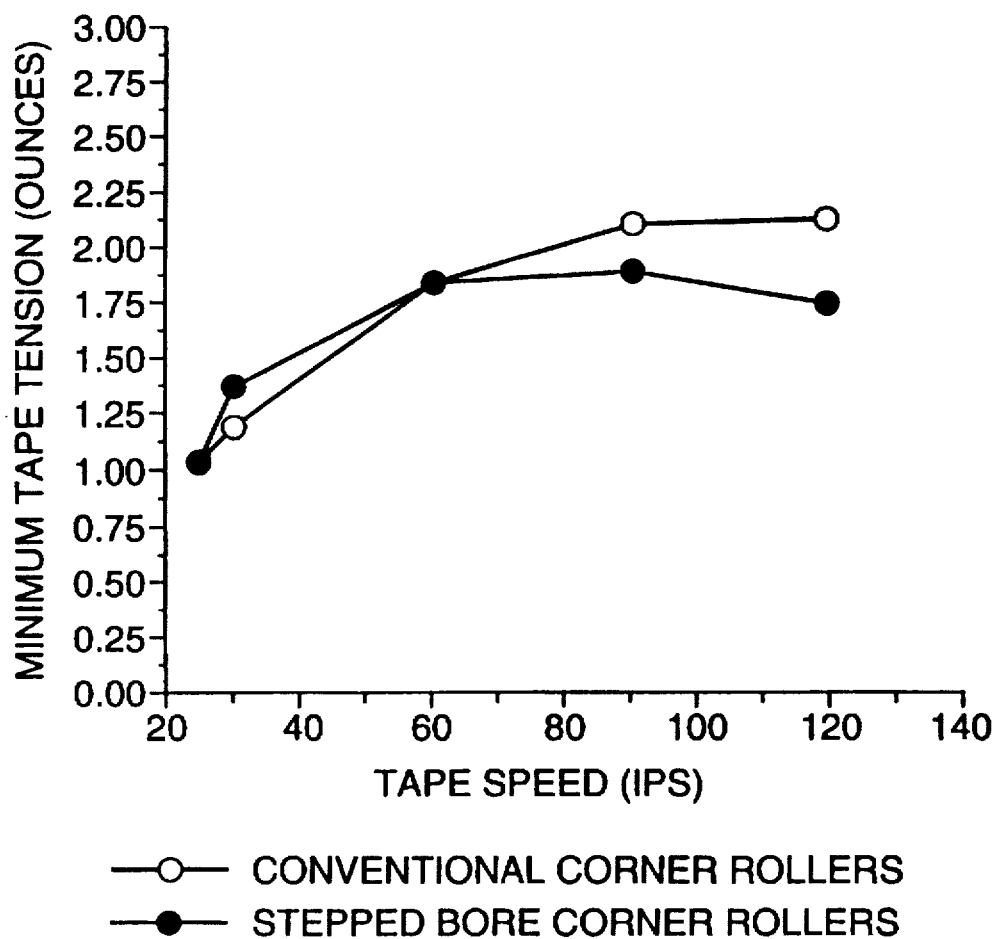
FIG. 6 is a plot of Minimum Tape Tension vs. Tape Speed for a data tape cartridge which includes the corner rollers of the invention.

The results for the minimum tape tension tests are plotted in FIG. 6. It is expected that the minimum tape tension in a belt driven data cartridge will increase with increasing tape speed. However, the cartridges which used two corner rollers of the invention showed less speed dependency of minimum tape tension than the controls using corner rollers with conventional constant diameter bores. This reduced variation in minimum tape tension, which becomes more pronounced as the tape speeds increase, permits more precise contact between the tape and a read/write head as tape speeds vary widely during recording or playback.

Figure 7:
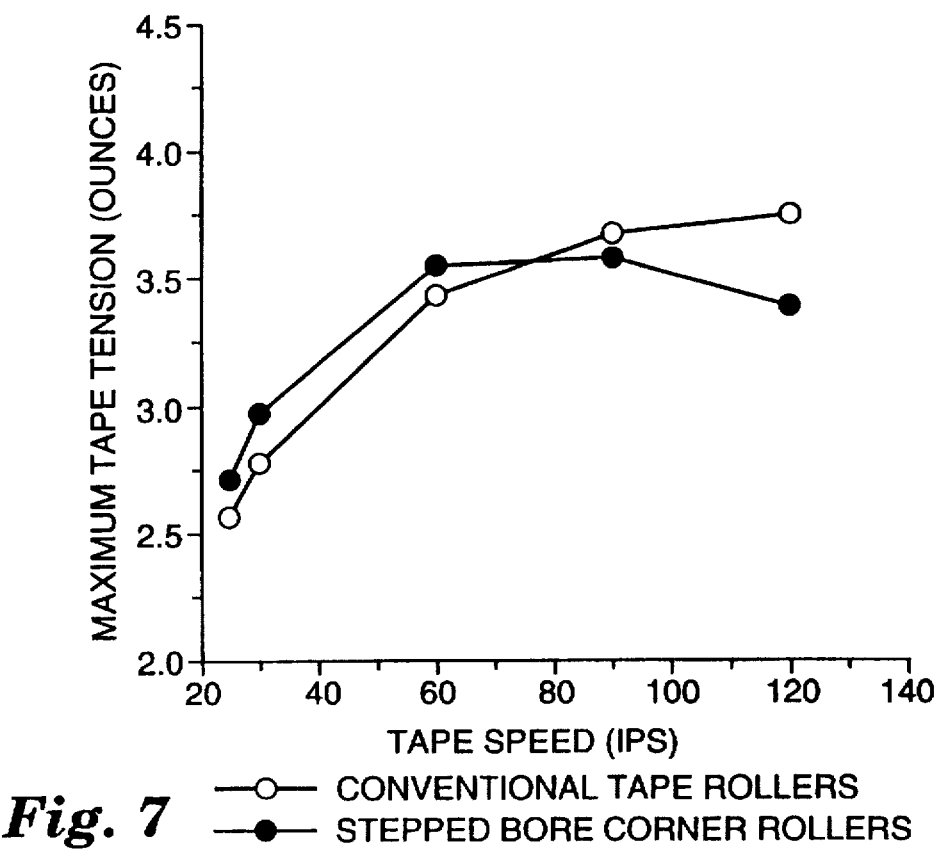
FIG. 7 is a plot of Maximum Tape Tension vs. Tape Speed for a data tape cartridge which includes the corner rollers of the invention.

The results for the maximum tape tension tests are plotted in FIG. 7. It is expected that maximum tape tension in a belt driven data cartridge will increase as tape speed increases. Data cartridges which use two corner rollers of the invention unexpectedly showed less speed dependency of maximum tape tension than controls using corner rollers with conventional constant diameter bores. This reduced variation in maximum tape tension, which again appears to be more pronounced at higher tape speeds, reduces wear on the read/write head and prevents tape distortion.

B. Drive Force

Drive force was also measured on the tape tension and drive force tester described above. Drive force is measured by monitoring the power output of the tester motor required to move the tape from one end of the cartridge to the other.

The results for the maximum drive force tests are plotted in FIG. 9. It is expected that drive force in a belt driven data cartridge will increase with increasing tape speed. Data cartridges which use two corner rollers of the invention unexpectedly showed less speed dependency of drive force than controls using corner rollers with conventional constant diameter bores. This reduced variation in drive force means that data cartridges using the corner rollers of the invention will consume less power, particularly at higher speeds, than conventional cartridges.

Figure 8:
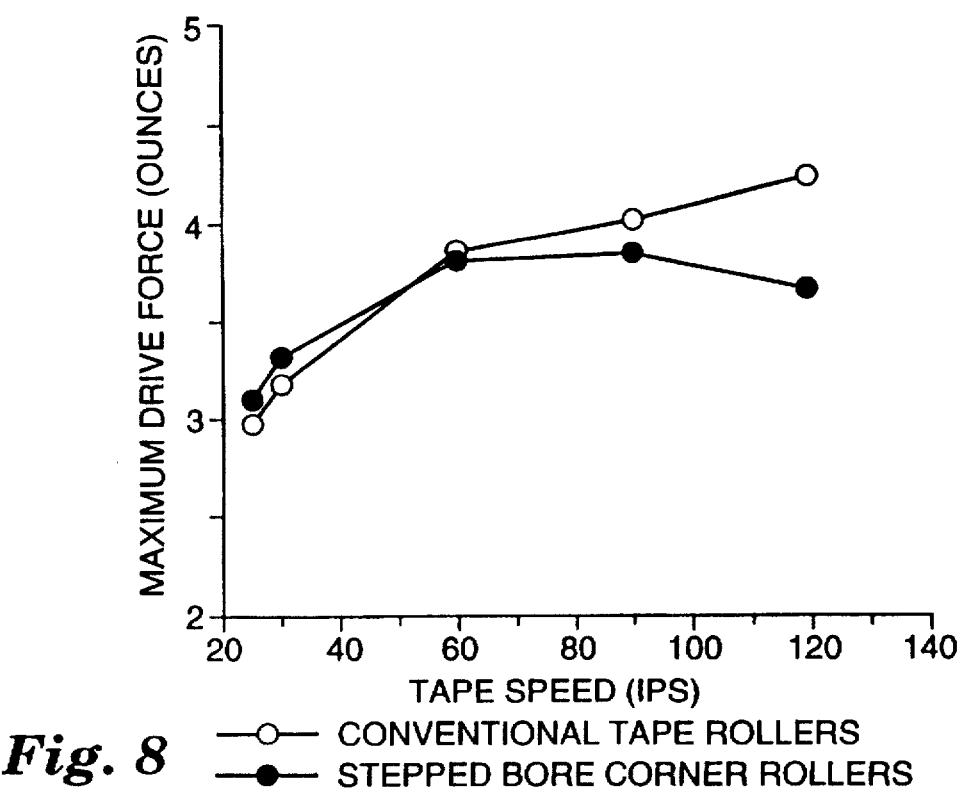
FIG. 8 is a plot of Maximum Drive Force vs. Tape Speed for a data tape cartridge which includes the corner rollers of the invention.

In belt driven data cartridge design, a component modification which reduces maximum drive force generally causes an undesirable decrease in minimum tape tension at low speeds. However, as illustrated in FIGS. 6–8, the drive force reduction produced by the corner rollers of the invention does not create the expected low speed decrease in minimum tape tension, and, for at least this reason, the drive force reductions are quite significant.

C. Component Wear

In addition, the component wear over life for the stepped bore corner rollers in the cartridges above was compared to that of the conventional corner rollers in the control cartridges.

Evaluation of tape tension and drive force performance over life cycling was accomplished by running the cartridges in drives set up to repeatedly cycle the cartridge from one end of the tape to the other. At pre-defined pass intervals (e.g., 1500, 2500, 5000, 7500, 10k passes), the cartridges were removed from the drives and tested using the tape tension and drive force tester as described above.

Figure 9A:
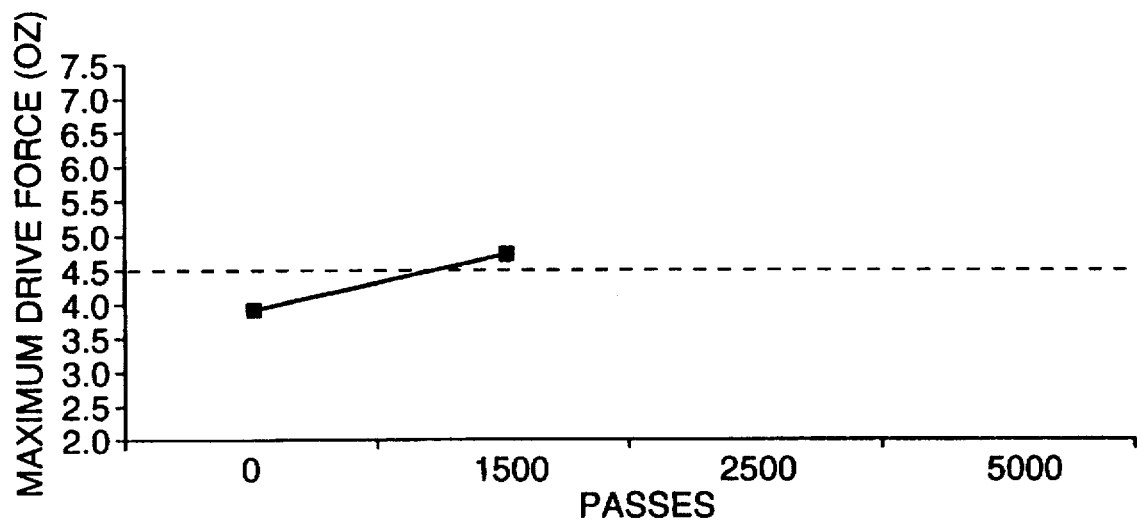
FIG. 9A is a plot of Maximum Drive Force at 90 inches per second (ips) (2.29 m per second) vs. Number of Passes for a conventional data tape cartridge.
Figure 9B:
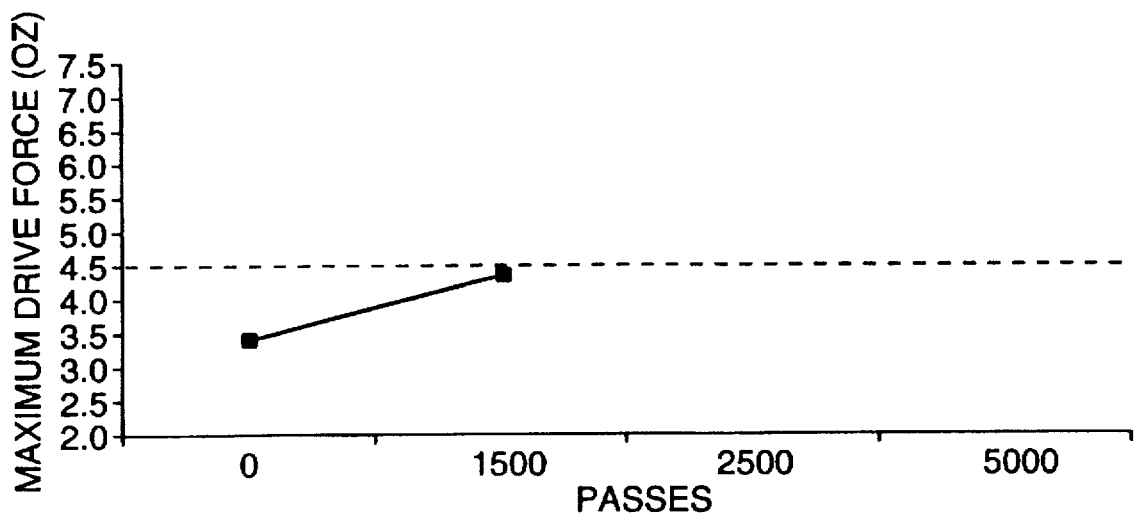
FIG. 9B is a plot of Maximum Drive Force at 90 inches per second (ips) (2.29 m per second) vs. Number of Passes for a data tape cartridge which includes corner rollers of the invention with a symmetrically loaded journal surface.

The results for the component wear tests for the conventional corner rollers and the corner rollers of the invention are plotted in FIGS. 9A and 9B, respectively. It is expected that the maximum drive force in a belt driven data cartridge will increase over the life of the cartridge. FIGS. 9A and 9B show that cartridges with two corner rollers of the invention unexpectedly showed less increase in average maximum drive force in extended durability testing than controls using corner rollers with conventional constant diameter bores. These data indicate that cartridges using the corner rollers of the invention will consume less power over their lifetimes than conventional cartridges.

Example 2

A sample of ten pairs of stepped bore corner rollers identical to those described in Example 1 were prepared. The stepped bore corner rollers were installed in data cartridges identical to those in Example 1, except that the small diameter portion of the bore was molded at the opposite end of the corner roller. The small diameter region of the bore was positioned adjacent the cartridge baseplate.

The component wear of these stepped bore rollers was compared to that of conventional corner rollers in cartridges identical to those in Example 1. Evaluation of tape tension and drive force performance over life cycling was performed as in Example 1.

Figure 10A:
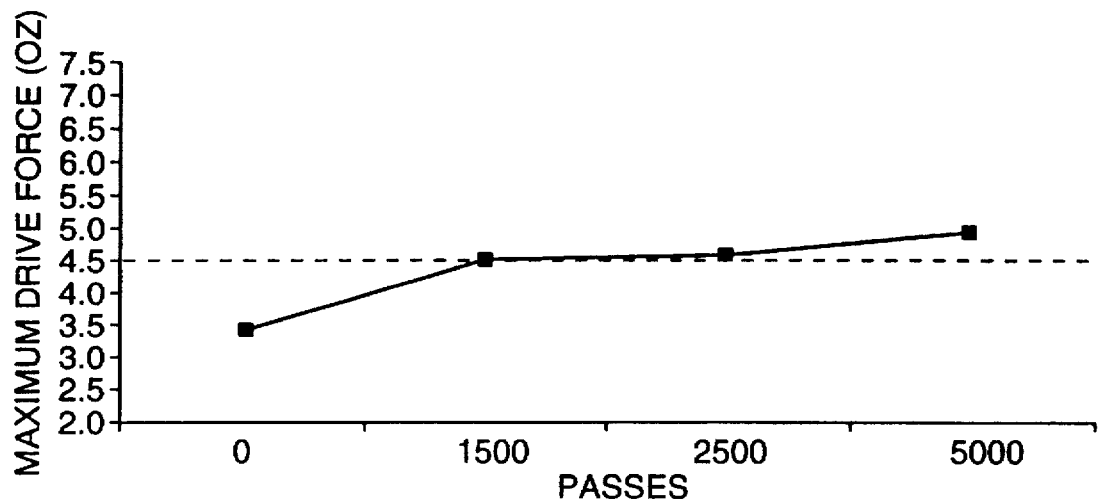
FIG. 10A is a plot of Maximum Drive Force at 90 inches per second (ips) (2.29 m per second) vs. Number of Passes for a conventional data tape cartridge.
Figure 10B:
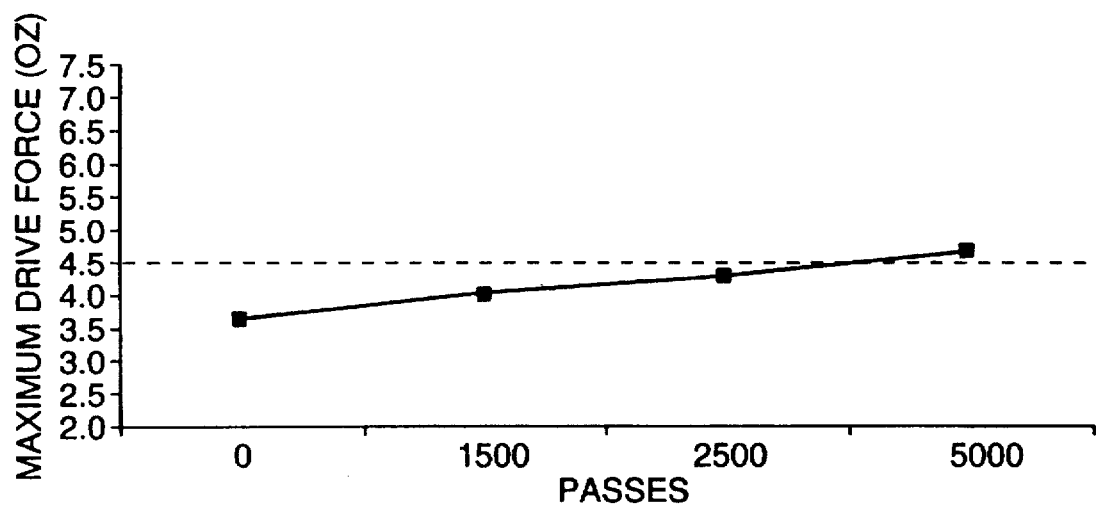
FIG. 10B is a plot of Maximum Drive Force at 90 inches per second (ips) (2.29 m per second) vs. Number of Passes for a data tape cartridge which includes corner rollers of the invention with an asymmetrically loaded journal surface.

The results for the component wear tests for the conventional corner rollers and the corner rollers of the invention are plotted in FIGS. 10A and 10B, respectively. FIGS. 10A and 10B show that cartridges with two corner rollers of the invention, irrespective of the orientation of the small diameter portion of the bore, showed a trend toward less increase in average maximum drive force in extended durability testing than controls using corner rollers with conventional constant diameter bores.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. AU alternative modifications and variations which fall within the spirit and scope of the appended claims are included in the present invention.

We claim:

1. A belt-driven tape cartridge comprising:
   a) a baseplate;
   b) a cover mounted to the baseplate, the cover and baseplate together forming a housing;
   c) two hubs rotatably mounted within the housing;
   d) at least two mounting pins mounted within the housing;
   e) a roller rotatably mounted to each mounting pin;
   f) tape wound into reels around the hubs and extending therebetween; and
   g) a drive belt wound around the tape reels and the rollers for moving the tape from one reel to the other, the belt placing a load on the roller;

each roller comprising:

h) an outer wall which contacts the drive belt; and i) an inner wall attached to the outer wall, the inner wall having a stepped axial bore with i) a large diameter region proximal the baseplate which does not engage the mounting pin;

ii) a small diameter region, located further from the baseplate than the large diameter region, having a length L parallel to the mounting pin slideably engaged with the corresponding mounting pin to rotatable mount the roller thereabout and form a journal surface on the pin, the length L and location of the small diameter region being positioned along the axis of the roller so as to substantially counterbalance the asymmetrical load to be applied thereto by the belts; and iii) wherein the length of the large diameter region parallel to the mounting pin plus the length of the small diameter region L equals C, where $C > L$, wherein the load placed on the roller by the drive belt is symmetrical about the length L, and wherein the load is centered along the axis of the roller at a height A above the plate, wherein $A = C - L/2$, where $A > L/2$.

2. A tape cartridge as claimed in claim 1, wherein said bore comprises a shoulder between the large diameter region and the small diameter region.

* * * * *